Figure 1:
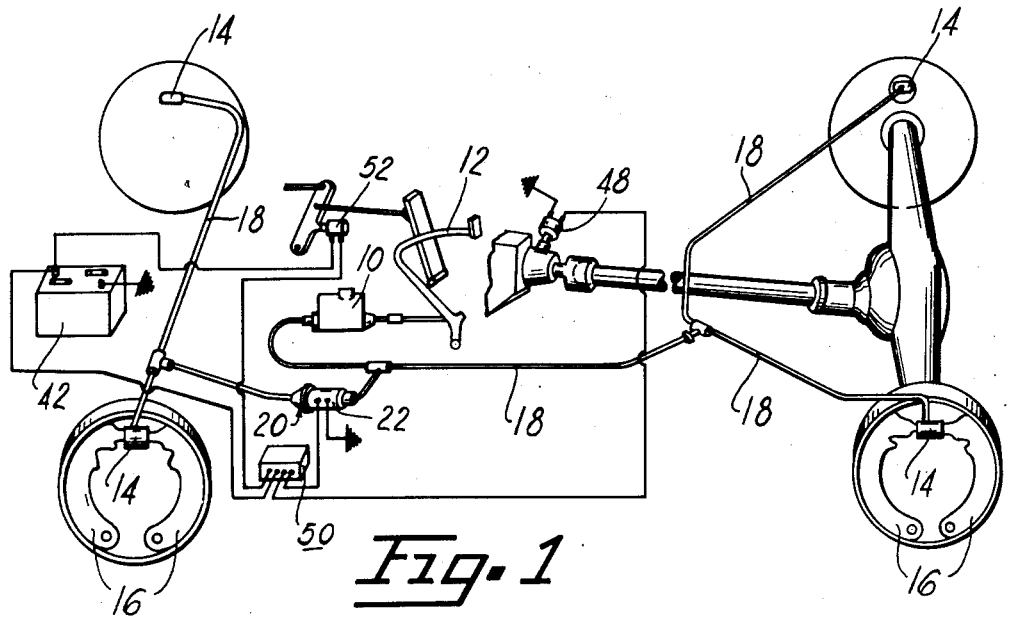

June 16, 1953  E. R. PRICE  2,642,484
SWITCH CONTROL MECHANISM
Filed Sept. 29, 1950  2 Sheets-Sheet 1

INVENTOR.
EARL R. PRICE
BY
ATTORNEY

June 16, 1953     E. R. PRICE     2,642,484
SWITCH CONTROL MECHANISM
Filed Sept. 29, 1950     2 Sheets—Sheet 2
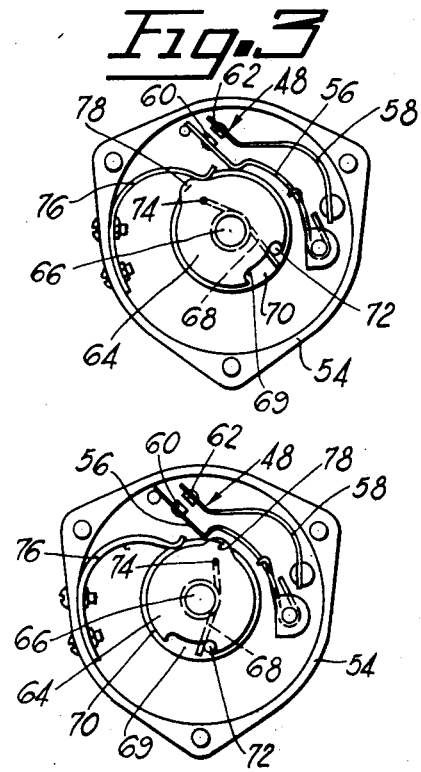
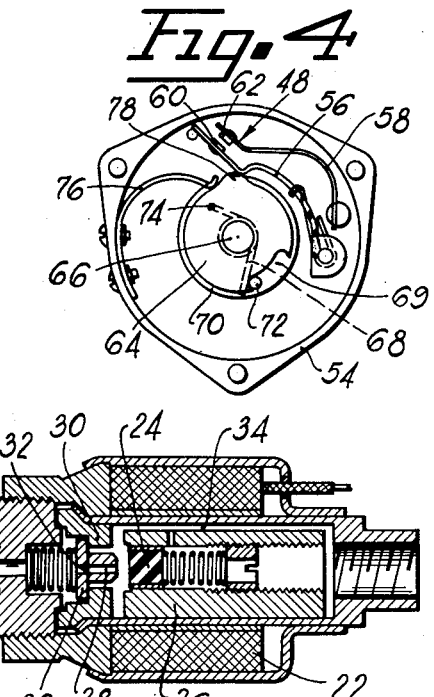
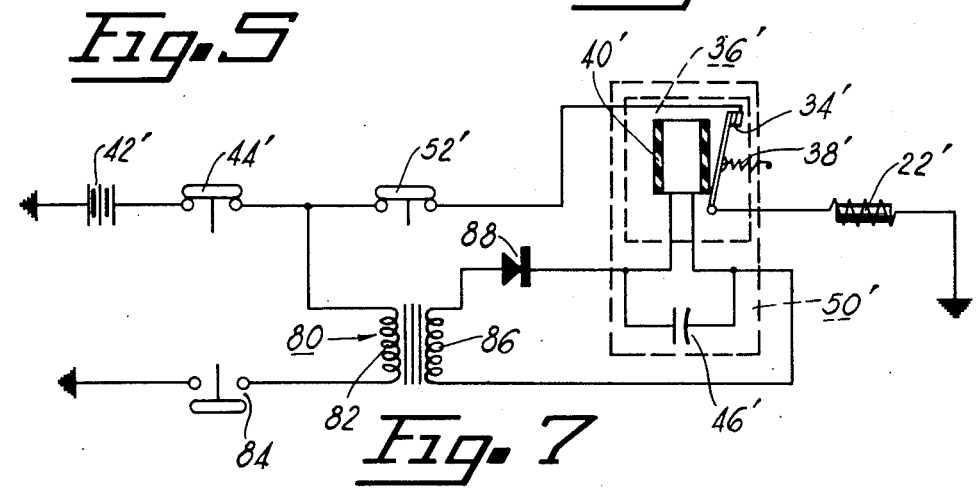
INVENTOR.
EARL R. PRICE
BY H. V. Clayton
ATTORNEY

UNITED STATES PATENT OFFICE 2,642,484

SWITCH CONTROL MECHANISM

Earl R. Price, South Bend, Ind., assignor to Bendix Aviation Corporation, South Bend, Ind., a corporation of Delaware Application September 29, 1950, Serial No. 187,465

2 Claims. (Cl. 175—320)

This invention relates in general to switch controlling means and more particularly to power operated means for timing the operation of a switch.

In certain arts, for example, any one of the automotive brake control art or the stamping press art, it is desirable to control the time of operation of a brake mechanism in its operation of either maintaining a certain mass static after said mass is brought to a stop or its operation of bringing said mass to a stop in which case the brake mechanism is applied while the mass is still in motion. It is accordingly an object of my invention to effect this end and this may be done by the provision of a simple, compact and easily serviced switch controlling electrical means which may include a relay said switch being included as a part of the relay and a part of the means being controlled, i. e., an anti-creep mechanism of the brake system of an automotive vehicle. With this adaptation of my invention there is provided means insuring an operation of the anti-creep mechanism either before or after the vehicle comes to a stop depending upon the adjustment of the mechanism.

Another object of my invention is to improve upon the governor controlled switch mechanisms of the day. Such mechanisms, i. e., the cubicle fly ball governor type of mechanism, are costly and have proven ineffective in operation when the same are used to control parts of the power plant of an automotive vehicle. Particularly is this true when this type of governor switch mechanism is called upon as a control at low vehicle speeds or to function after the vehicle is brought to a stop. However, with my invention the switch of the control mechanism is certain of operation either at the beginning of a certain period of time before the vehicle is stopped or at the end of a certain period of time after the vehicle is brought to a stop, the particular operation depending upon the adjustment of the mechanism.

Yet another object of my invention is to provide a switch controlling mechanism controlled by a control member, i. e., a vehicle speed responsive governor operated switch, such that the switch to be controlled may be operated either before a certain event, for example, at a certain time before said control member comes to a stop, or at a certain time after said event, for example, at a certain time after said member comes to a stop, or at the same or substantially the same time as the happening of said event, for example at the same or substantially the same time said member comes to a stop.

A further object of my invention is to provide, in an automotive vehicle including a four-wheel brake mechanism, brake anti-creep means, including a valve or its equivalent, for controlling the operation of two of the wheel brakes of the mechanism preferably the two front brakes; together with means, responsive to the speed of rotation of two of the wheels preferably the two rear wheels of the vehicle, for controlling said valve.

Yet another object of my invention is to provide mechanism for controlling the operation of a switch including power means comprising a power element connected to the switch, means for energizing the power means and controlling its time of operation including a source of power and control means therefor and further including other power means for energizing the power means the latter power means constituting the principal element of the mechanism in determining the time of operation thereof.

The above and other objects and features of the invention will appear more fully hereinafter from a consideration of the following description taken in connection with the accompanying drawings where two embodiments of the invention are illustrated by way of example.

Figure 2:
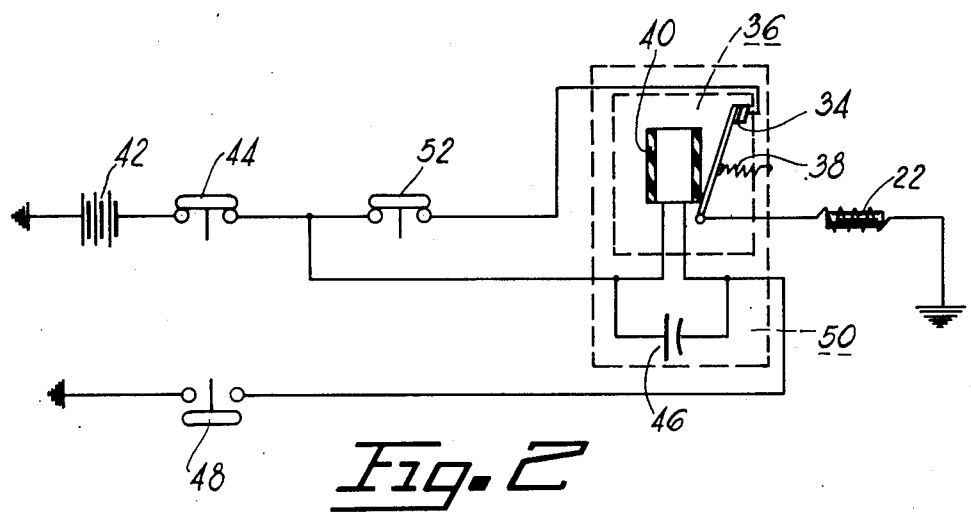

Figure 1 is a diagrammatic view disclosing one embodiment of my invention employed as a part of the anti-creep mechanism of an automotive vehicle;

Figure 2 discloses the electrical hookup of the mechanism of Figure 1;

Figures 3, 4, and 5 disclose details of the speed responsive breaker switch mechanism used in my invention, the switch operating means thereof being shown in several of its operative positions;

Figure 6 is a sectional view disclosing details of the solenoid operated check valve of the mechanism of Figure 1; and Figure 7 discloses the electrical hookup of another embodiment of my invention.

There is disclosed in Figures 1 and 2 a preferred embodiment of my invention wherein my switch controlling mechanism is employed to control a well known type of brake mechanism of an automotive vehicle said mechanism including a well known type of anti-creep mechanism. This brake and anti-creep mechanism, no claim to which is made, includes a master cylinder 10 housing a piston, not shown, which is actuated as a result of the manual operation of a brake pedal 12. Depression of the brake pedal to apply the brakes energizes slave cylinders 14 which in turn actuate the brake shoes 16 of the wheel brakes of the vehicle. In this operation an incompressible or substantially incompressible brake fluid flows through conduits 18 and upon release of the brake pedal a certain mechanism including return springs, not shown, operates to return the parts of the mechanism to their brake off positions.

Briefly describing the anti-creep mechanism of this well known brake mechanism a solenoid operated check valve 20, Figure 6, preferably inserted in the system to control the front brakes of the vehicle, operates, with a release of the brake pedal and after the energization of a grounded solenoid 22, to trap the brake fluid between the slave cylinders and said valve, thereby holding the brakes in their applied position; however, said solenoid when deenergized serves to disable this valve and thereby disable the anti-creep mechanism. Describing the latter operation a spring loaded yieldable member 24, housed within the armature 26 of the solenoid, is spaced from an opening 28 in the pole piece 30 of the solenoid thereby making it possible for the brake fluid to return through an opening 32 in the check valve, the opening 28, and thence through a recess 34 in the armature 26 and on toward the master cylinder 10.

In certain cars of the day the solenoid 22 is energized and deenergized, to operate the anti-creep portion of the brake mechanism, with an operation of a vehicle speed responsive governor operated switch; however, as stated above this governor is somewhat uncertain in operation particularly as to its time of operation. Accordingly, it is the principal object of my invention to provide an efficient and effective means for controlling the time of operation of a switch mechanism and said control means may, as disclosed in Figures 1 and 2, be substituted for the aforementioned vehicle speed responsive governor operated control switch of the anti-creep mechanism of the day.

Describing now the switch control means of Figures 1 and 2 there is provided a normally closed switch 34 of a relay 36; and this switch is preferably biased to its closed position by a spring 38. The coil 40 of the relay is electrically connected in series with a grounded battery 42, the ignition switch 44 of the vehicle and a grounded vehicle speed responsive breaker switch 48 which is opened when the car is brought to a stop. No claim is made to the latter switch inasmuch as the same is the invention of James K. Tom and is disclosed in his U. S. application for patent, Serial No. 202,714, filed December 26, 1950. An important feature of my invention lies in the provision of a condenser 46 which is electrically connected in parallel with the relay coil 40 in the aforementioned electrical circuit including the battery, the ignition switch and the breaker switch. The relay 36 and condenser 46 may be housed within one container indicated by the reference numeral 50 in Figures 1 and 2.

The parts of the mechanism of Figure 1, particularly the condenser 46 and the rate of change thereof, are preferably so constructed and arranged and so operative that the anti-creep mechanism is rendered operative at the beginning of a certain period of time before the vehicle comes to a stop; or the parts of the mechanism may be constructed and arranged and operative to effect an operation of the anti-creep mechanism at the end of a certain period of time after the vehicle comes to a stop. An inspection of the electrical hookup of Figure 2 and an inspection of the switch mechanism 48 of Figures 3, 4, and 5 reveals the operation of the mechanism to effect either one of these results inasmuch as the condenser 46 is electrically connected in parallel with the relay coil 40. As to the four-wheel brake mechanism of Figure 1 it is to be particularly noted that the anti-creep portion of this mechanism is operative to control only the two front wheel brakes and that the means for controlling the anti-creep mechanism, including the condenser 46, is responsive to the speed of rotation of the two rear wheels of the vehicle.

As to the remainder of the electrical circuit for controlling the operation of the solenoid of the anti-creep mechanism said circuit includes, in series with the solenoid, the normally closed relay switch 34, an accelerator operated breaker switch 52, the ignition switch 44, and the grounded battery 42. The accelerator operated breaker switch 52 is not disclosed in detail inasmuch as no claim is made thereto the same being of any of the well known designs of such a switch. This switch 52 is closed when the accelerator is in its released position.

Describing now the speed responsive breaker switch 48 disclosed in Figures 3, 4, and 5 this switch includes a casing 54 to which are secured flexible switch contact arms 56 and 58, switch contacts 60 and 62 being mounted on the ends of said arms respectively. A disc shaped switch operating cam member 64 is rotatably mounted on a switch drive shaft 66 the two being yieldably connected by means of a torque spring 68 sleeved over the shaft and lying between the cam 64 and a flange 70 fixedly connected to the shaft. One end of the spring 68 abuts a drive pin 72 which extends laterally from the face of the flange 70 and within a recess 69 in the cam; and the other end of the spring extends within an opening 74 in the cam. The torque spring serves to rotate the cam in the same direction as the switch drive shaft normally rotates; and a leaf spring 76 of sufficient tension is mounted on the switch casing and serves to arrest the movement of the cam once per revolution while the drive shaft continues its rotation and its operation of loading the torque spring. As the drive shaft overruns the cam, say a one-eighth turn to the position disclosed in Figure 4, said shaft and cam rotate as one and force a cam lug 78 past the leaf spring. Immediately thereafter the torque spring causes the cam to overrun the drive shaft one-eighth turn to its original and normal position the parts being then in the position disclosed in Figure 5. During the overrun operation the cam lug 78 serves to move the flexible switch arm 56 toward the arm 58 thereby closing the switch contacts 60 and 62 momentarily. The switch arm 56 is so placed that even though the drive shaft should stop its movement simultaneously with release of the cam lug from the leaf spring 76 said lug will nevertheless ride past the switch arm and will never hold the switch contacts closed for more than an instant. The drive shaft 66 is preferably drivably connected to the speedometer cable of the vehicle and the parts of the mechanism are preferably so constructed and arranged that the relay 36 is energized and deenergized and the condenser 46 is charged approximately 1,000 times per mile of travel of the vehicle.

Describing now in brief an operation of the embodiment of my invention disclosed in Figures 1 and 2 the anti-creep mechanism is rendered inoperative so long as the car is in motion; this for the reason that the relay switch 34 is held open by an operation of the breaker switch and the condenser thereby rendering the check valve 20 inoperative to trap the brake fluid in the slave cylinders. However at the end of a certain period of time after the car is brought to a stop, that is the period during which the condensor is in its process of discharging, the switch 34 is automatically closed by an operation of the spring 38 thereby effecting an energization of the solenoid 22 to render the anti-creep mechanism operative. It is repeated however that the mechanism of Figures 1 and 2 may be adjusted to effect the initiation of the operation of the anti-creep mechanism at the beginning of a certain period of time before the car comes to a stop.

There is disclosed in Figure 7 another embodiment of my invention designed to insure the operation of the condenser to effect the desired delay in the operation of the relay switch after the vehicle or other moving control means is brought to a stop. In this embodiment the aforementioned series connected check valve operated solenoid, relay switch, accelerator operated switch, ignition switch and grounded battery are the same as the corresponding mechanism in the previously described embodiment of my invention. These parts are accordingly given the same reference numerals with the addition of a prime; and the relay coil, relay spring and condenser being the same these parts are also given the same reference numeral with the addition of a prime.

In the embodiment disclosed in Figure 7 the source of electricity for effecting an energization of the relay coil 40' and the condenser 46' consists of a transformer 80 of conventional design the primary winding 82 of this unit being electrically connected in series with the ignition switch 44', the grounded battery 42' and a grounded breaker switch 84 of simple design and of any well known make. This breaker switch, no claim to which is made, may, i. e., be similar in operation to the breaker points in an automotive distributor. The secondary winding 86 of the transformer is electrically connected in series with the condenser 46'; and said winding is also connected in series with the relay coil 40'. As with the mechanism of Figure 2 the condenser 46' of Figure 7 is electrically connected in parallel with the coil 40' in the electrical hookup. A rectifier 88 may be included in the circuit including the secondary 86 this unit having a check valve like action to prevent the condenser 46' from discharging back into said secondary; in other words with the rectifier incorporated in the electrical hookup current will flow only from the transformer and not into the transformer.

There is thus provided, by the mechanism of Figure 7, means for insuring an operation of the condenser to effect the desired timed operation of the relay switch so that there is effected the desired operation of said switch at the end of a relatively short period of time after the switch operating means of the breaker switch 84 comes to a stop; for it is to be borne in mind that the particular switch controlling mechanism of Figure 7 is only operative when the electrical circuit including the primary winding 82 is being alternately made and broken. Accordingly, even if the breaker switch 84 remains closed after the moving control element comes to a stop the mechanism would nevertheless operate to effect the desired result inasmuch as with this stoppage the transformer would no longer operate to charge the condenser. On the other hand with the mechanism of Figures 1 and 2 if the switch 48, through malfunction, remains closed when the vehicle comes to a stop then in this event the condenser 46 would remain charged and the switch 34 would remain open thereby preventing an operation of the anti-creep mechanism.

The relay switch 34, that is the switch which is controlled, may also be employed to control the operation of a transmission operating mechanism of an automotive vehicle to effect, say a low gear setting of said mechanism. To effect this operation of my invention the parts of the mechanism would have to be so constructed as to effect a closure of the switch 34 a short time prior to a stopping of the vehicle; and this may be accomplished by the necessary determination of any one of or a plurality of the resistance of the relay coil 40, the strength of the spring 38, the capacity of the condenser in microfarads, the insertion of a variable resistance in parallel with the condenser, or the number of times the switch 48 opens per mile of travel of the vehicle. Such a use of my invention provides a mechanism operating to facilitate a meshing of the gears of the transmission inasmuch as said meshing operation occurs with the vehicle in motion both of the gears or equivalent means to be meshed being in motion at that time. The advantage of this mechanism will become apparent when it is remembered that when the vehicle is at rest an operation of the transmission to effect a new setting will probably result in a tooth abutment of the gears to be meshed thus preventing the desired operation.

There is thus provided, by the control means of my invention, an efficient and effective power operated means for controlling the time of operation of a switch mechanism; and this switch control mechanism, including a switch for controlling a mechanism and means for controlling the time of operation of said switch, may be incorporated in any one of many mechanisms, i. e., the above described anti-creep mechanism and transmission control mechanism of an automotive vehicle. The switch operating power means of my invention may, for example, include a motor such as the coil 40 of the relay 36, means for energizing the motor including a source of power such as the battery 42, means for controlling the source of power such as the breaker switch 48, and means, such as the condenser 46, also controlled by the breaker switch and operable to store energy said energy storing means being activated by the source of power and operable as a supplemental means for energizing the motor.

The switch control means of my invention also finds a place when used in an automotive vehicle including a fluid coupling combined with the above described hydraulic and anti-creep mechanism; and my invention may also be incorporated in the brake mechanism of a stamping press wherein it is desirable to employ a small and inexpensive brake to maintain a relatively massive fly wheel or equivalent part of the press static. With the mechanism of my invention the brake is applied to the fly wheel of the stamping press after and only after said fly wheel has come to a stop; or the parts may be constructed and adjusted so that the brake is applied just before the fly wheel comes to a stop.

I claim:

1. Mechanism for controlling the time of closing of a switch including power means comprising a power element operably connected to the switch, means for energizing the power means including a source of power, control means for the source of power including an intermittently operable mechanically operated movable member, a control member operably connected to the movable member, means, rendered operable by an operation of the control means when and only when said control member is performing its operation, for effecting an energization of the power means; together with a supplementary means for effecting an energization of the power means said supplementary means being also controlled by an operation of the control means.

2. Mechanism for controlling the operation of a switch including power means comprising a power element adapted to be operably connected to the switch, means for energizing the power means including a source of electrical power, control means for the source of electrical power including an intermittently operable mechanically operated movable member, a switch means operably connected to the movable member, means, including a transformer controlled by an operation of the switch means when and only when the switch member is performing its operation, for effecting an energization of the power means, together with a supplementary means for effecting an energization of the power means said supplementary being also controlled by an operation of the switch member.

EARL R. PRICE.

References Cited in the file of this patent

UNITED STATES PATENTS

| Number | Name | Date |
|---|---|---|
| 322,808 | Delaney | July 21, 1885 |
| 1,672,049 | Almquist | June 5, 1928 |
| 2,183,412 | Sledd | Dec. 12, 1939 |
| 2,274,992 | Nelson | Mar. 3, 1942 |
| 2,383,328 | Lyle | Aug. 21, 1945 |
| 2,391,129 | Chambers | Dec. 18, 1945 |
| 2,428,589 | Aandewiel | Oct. 7, 1947 |
| 2,475,850 | Moore et al. | July 12, 1949 |
| 2,489,929 | Raybould | Nov. 29, 1949 |